F. D. WALLACE.
REVERSIBLE PLOW.
APPLICATION FILED MAY 6, 1916.
1,227,349.
Patented May 22, 1917.
2 SHEETS—SHEET 1.
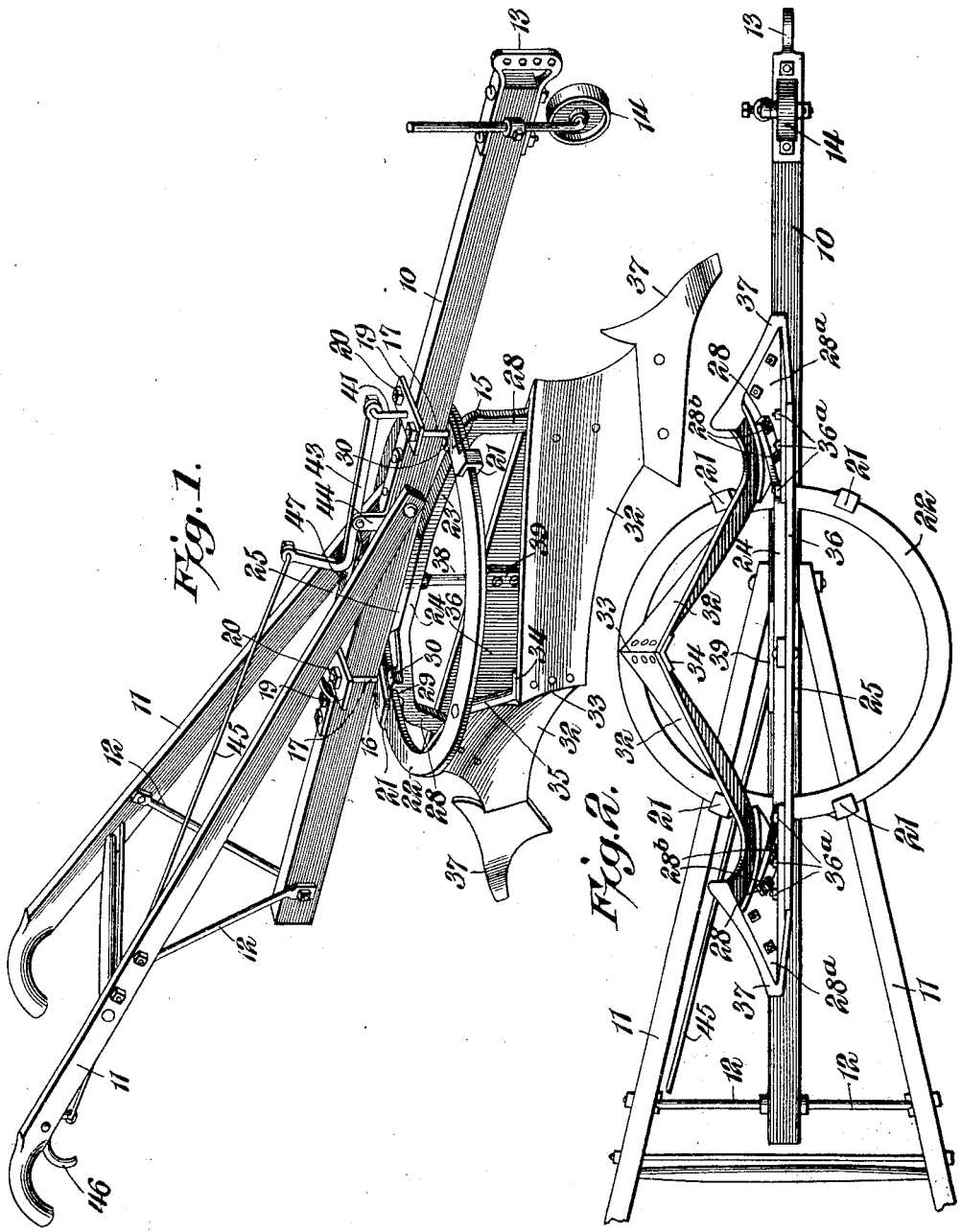
WITNESSES
F. D. Wallace, INVENTOR,
BY
ATTORNEY F. D. WALLACE.
REVERSIBLE PLOW.
APPLICATION FILED MAY 6, 1916.
1,227,349.
Patented May 22, 1917.
2 SHEETS—SHEET 2.
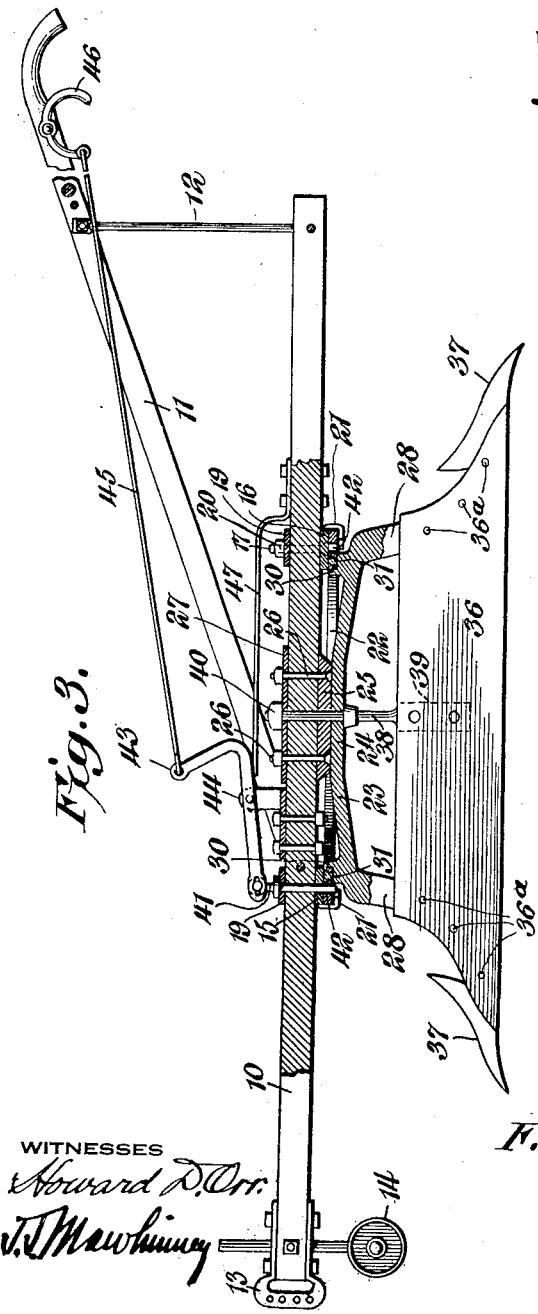
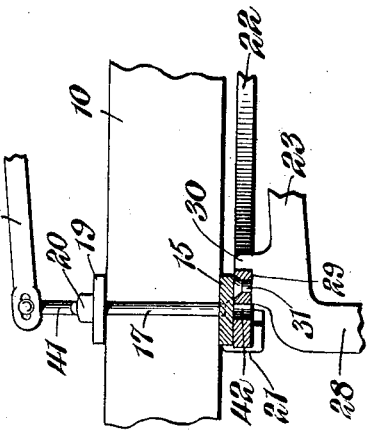
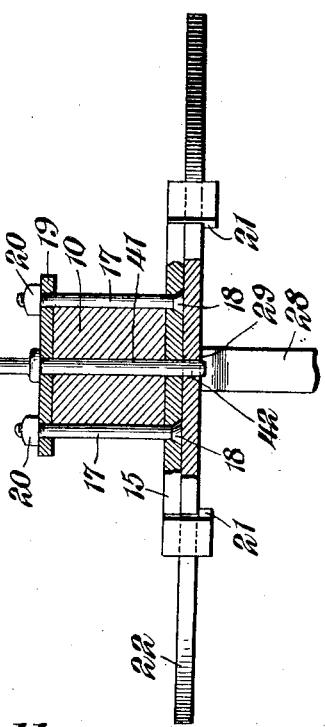
F. D. Wallace, INVENTOR,

UNITED STATES PATENT OFFICE.

FRANCISCO DRALVERADO WALLACE, OF WESTFIELD, NEW YORK, ASSIGNOR OF ONE-THIRD TO ALVIN GIFFORD AND ONE-THIRD TO REUBEN W. GIFFORD, OF CLEVELAND, OHIO.

REVERSIBLE PLOW.

1,227,349.      Specification of Letters Patent.      Patented May 22, 1917.

Application filed May 6, 1916. Serial No. 95,861.

*To all whom it may concern:*

Be it known that I, FRANCISCO D. WALLACE, a citizen of the United States, residing at Westfield, in the county of Chautauqua, and State of New York, have invented a new and useful Reversible Plow, of which the following is a specification.

The present invention relates to reversible plows, and has for an object to provide an improved structure of reversible plow which may be used with equal facility as a level land or a side hill plow.

Another object of this invention is to provide a peculiar construction and arrangement of a pair of mold-boards carrying plow points, and a land-side common to and connecting the mold-boards at one side, the mold-boards being directly connected together at the opposite side forming a structure of great strength and durability; to provide an improved turntable structure having brace connections between the same and the mold-boards; and to provide improved front and rear guides for supporting the turntable beneath the plow beam.

Other objects and advantages of this invention will be brought out in the following specific disclosure of the present preferred embodiment, the same being illustrated in the accompanying drawings, wherein Figure 1 is a perspective view of a plow constructed according to this invention, the parts being adjusted to disclose the mold-board side of the plow.

Fig. 2 is a bottom plan view of the same.

Fig. 3 is a side elevation of the plow, looking at the side opposite that shown in Fig. 1, and showing parts of the plow in section.

Fig. 4 is a detail, enlarged, transverse sectional view, taken through the front guide, and showing the locking bolt and the turntable in locked position.

Fig. 5 is a fragmentary side view of the same, the turntable and front guide being shown in section.

Referring to these drawings, wherein like parts are designated by similar characters of reference throughout the several views, 10 designates the usual plow beam having handles 11, and braces 12 between the handles and the beam. The beam may be provided at its forward end with a clevis 13 and a gage wheel 14, as shown.

The beam 10 carries a front guide 15 and a rear guide 16. The guides 15 and 16 are spaced apart longitudinally of the beam 10. The guides are adjusted upon the beam 10, and clamped when adjusted, by means of bolts 17 having their heads 18 counter-sunk in the lower faces of the guides 15 and 16, and extending upwardly from the guides against the opposite side edges of the beam 10. Clamping plates 19 extend across the top of the beam 10 over the guides 15 and 16 and are suitably apertured to receive the upper ends of the bolts 17 therethrough. Clamping nuts 20 are carried on the upper ends of the bolts 17, and are turned down against the clamping plates 19 to bind the guides 15 and 16 in position. (See Fig. 4).

Each guide comprises an arcuate plate, the opposite ends of which extend beyond the opposite sides of the plow beam 10. The outer edges of these arcuate plates are provided, at the opposite ends of the plates, with downwardly extending inturned fingers or flanges 21, the lower horizontal portions of which lie in spaced relation beneath the lower faces of the plates. From Fig. 5 particularly, it will be noted that the lower ends of the figures 21 project but a short distance inwardly beneath the arcuate plate.

These guides or braces 15 and 16 carry a turntable 22. The turntable 22 comprises a flat ring of substantial diameter. The ring engages at its upper face against the lower faces of the arcuate plates, while the fingers 21 lap downwardly about the peripheral edge of the ring and extend beneath the same to hold the turntable 22 in the guides. As shown to advantage in Figs. 1, 2 and 3, these guides 15 and 16 engage the turntable 22 at diametrically opposed points, and retain the turntable from lateral displacement from beneath the plow beam.

The turntable is provided with a longitudinal brace 23. The brace 23 is arched at its middle and extends diametrically across the turntable 22. Intermediate the arch of the brace 23 is a flat bearing portion 24 engaging against the lower face of a bearing plate 25, the latter being secured against the lower face of the beam 10 by bolts 26, or the like, which pass upwardly through the beam and through a clamping plate 27 on the upper face of the beam. The heads of the bolts 26 are counter-sunk in the lower face of the bearing plate 25 to provide a smooth uninterrupted lower face therefor, against which the bearing portion 24 of the brace 23 may turn. The brace terminates at its ends in depending standards 28 which preferably flare outwardly and downwardly, as shown to advantage in Figs. 2 and 3.

As best shown in Figs. 5, the upper corners of the brace 23 are provided with raised seats 29 which have flat faces for engagement against the lower flat side of the turntable 22. Lugs 30 project upwardly from the inner ends of the seats 29 and provide shoulders engaging the inner edge of the turntable 22. These lugs 30 hold the brace and turntable from relative movement. The seats 29 have upstanding studs 31, which project through openings formed in the turntable 22. The upper ends of the studs 31 are headed, and are counter-sunk in the upper face of the turntable to secure the brace thereto, and to provide a smooth upper face on the turntable.

Each standard 28 is connected at its lower end to a frog 28ª. The frog and standard are of the usual shape. As shown in Fig. 2, a mold-board 32 is secured by bolts 28ᵇ, to one side of each frog 28ª. The bolts 28ᵇ also pass through the lower ends of the standards 28 to hold the frog thereto.

The mold-boards 32 are of the usual construction with the exception that they are elongated and have straight rear and forward edges 33 which abut, and which are secured together by an overlapping angle iron 34. With this construction, one mold-board forms a brace for the other. These mold-boards 32 extend backwardly, and flare outwardly in the usual manner.

The angle iron 34 terminates at its upper end in a post or arm 35 which extends upwardly and is riveted or otherwise secured to the turntable 22, at a point substantially above the meeting edges 33 of the mold-boards.

A preferably one piece land-side plate 36, forming a double land-side, is secured at its ends to the opposite sides of the frogs 28ª by bolts 36ª. The land-side plate 36 extends diametrically across and beyond the under side of the turntable. Each frog 28ª has the usual plow points 37 bolted thereto in the ordinary manner as shown.

A pivotal bolt 38 has a flat head 39 at its lower end riveted, or otherwise suitably secured, against the inner face of the land-side plate 26, at or about the center. The bolt 38 extends upwardly and centrally through the turntable 22, and through centrally disposed openings in the flat portion 24 of the brace, in the bearing plate 25, in the plow beam 10, and in the clamping plate 27. (See Fig. 3). The upper end of the pivotal bolt 38 is provided with a clamping nut 40, which bears against the clamping plate 27 to draw the pivotal bolt 38 upwardly and support the intermediate portion of the double land-side 36.

From this structure, it will be seen, upon reference to Fig. 2, that the points 37 are mounted upon the opposite ends of a substantially triangular frame formed by the connected mold-boards and land-side, and that the entire plow structure is firmly braced to resist longitudinal and transverse strains and stresses. The double land-side 36 is so positioned that it takes up lateral and longitudinal pressure exerted upon the mold-board when the plow is moving in either direction. The mold-boards 32 are secured together and inter-braced, so that one supports the other in their alternate use. The upstanding post 35, which rises from the meeting edges of the mold-boards, braces both the mold-boards and turntable and tends to make the triangular structure even more rigid.

This double plow structure is adapted to be drawn in either direction in the usual manner of operating plows, and admits of the reversing of the plow without lifting the same out of the furrow.

The beam 10 is adapted to rotate upon the turntable 22, and, as shown in Fig. 3, 4 and 5, carries a locking bolt 41, which projects vertically downward through the beam and through the front guide 15.

The turntable 22 has, at diametrically opposed points and immediately over each depending brace arm 28, an opening 42. The openings 42 are adapted to be brought one at a time into register with the locking bolt 41 to hold the turntable in the desired adjusted position beneath the plow beam.

A lever 43 is hinged, intermediate its ends, upon a bracket lug 44 upstanding from the beam 10, and has its forward end pivotally and loosely connected to the upper end of the locking bolt 41. The opposite arm of the lever 43 is bent upwardly near its rear end, and has connection with a connecting rod 45 which extends rearwardly between the handles 11. A trigger 46 is hinged upon one of the handles near the upper end thereof, and has connection with the rod 45 so that movement of the trigger from normal position draws the connecting rod 45, raises the forward end of the lever 43, and lifts the bolt 41 out of engagement with the turntable. A spring 47, shown in the present instance as of the leaf type, is secured to the upper face of the plow beam 10, extends longitudinally thereof, and bears at its free end against the heel of the lever 43 to normally urge the forward end of the lever downwardly and hold the locking bolt 41 in engagement with the turntable 22.

It will be observed that the plow structure comprising the mold-boards, plow points and land-side is connected to the turntable by four different connections, viz: at the front and rear by the standards 28 formed on the ends of the brace 23, and at the sides by the post 35 and the bolt 38. Thus, the parts are effectively braced against longitudinal and transverse strains and pressures, and are held in true alinement. These elements serve also to give a firm foundation for the turntable, supporting it from below at four different points, in addition to which the turntable is maintained in correct horizontal position by the two guides 15 and 16.

My invention is further distinguished from others of its type by the fact that the land-side extends up as high as the tops of the two mold-boards which it connects, this being shown clearly in Figs. 1 and 3.

What is claimed is:—

1. In a reversible plow, a turntable, a double land-side arranged beneath the turntable, a pair of mold boards carried by the turntable adjacent each end of the land-side and connected thereto and extending backwardly and flaring outwardly therefrom, the inner ends of said mold-boards abutting in laterally spaced relation from the land-side, and a post depending from the side of the turntable above the meeting ends of said mold-boards and secured at its lower end to the meeting ends of the mold-boards.

2. In a reversible plow, a turntable, diametrically arranged standards depending from the turntable, a double land-side arranged below the turntable and having connection with said depending standards, mold-boards also connected to said standards and extending backwardly and flaring outwardly from the land-side, and a post connected to the inner ends of said mold-boards for joining the same, said post extending upwardly and connected with the turntable to brace the mold-boards.

3. In a reversible plow, a turntable, diametrically arranged standards depending from the turntable, a double land-side extending diametrically across and beyond the under side of the turntable, a pivot bolt carried by the turntable and extending downwardly and having rigid connection with the intermediate portion of the land-side, a pair of mold-boards each carried by a respective standard and extending backwardly and flaring outwardly from the land-side, the rear ends of said mold-boards meeting, and a post connecting the meeting ends of the mold-boards and extending upwardly and connected with the turntable.

4. In a reversible plow, a turntable, a double land-side, a pair of mold-boards, means for connecting the ends of the land-side and the mold-boards together, said mold-boards having their inner ends abutting in spaced relation from the intermediate portion of the land-side, diametrically arranged standards depending from the turntable and connected to the adjacent ends of the land-side and the mold-boards, a post connecting the abutting ends of the mold-boards and having its upper end secured to the turntable, and a pivot bolt depending centrally through the turntable and secured at its lower end to the intermediate portion of the land-side, said standards, post, and pivot bolt providing four points of support and connection for the land-side and mold-boards with the turntable.

5. In a reversible plow, a substantially circular turntable, a double plow point structure arranged beneath the turntable, a plow beam, arcuate guides each provided with circumferentially spaced means embracing the turntable, means for mounting the guides rigidly to the under side of the plow beam and in spaced-apart relation so as to engage the turntable at diametrically opposite points, said arcuate guides extending laterally from the opposite sides of the plow beam and conforming in curvature to the turntable so as to retain the same from lateral displacement, and means for pivotally connecting the plow structure to the beam.

6. In a reversible plow, a plow beam, front and rear circumferentially extending arcuate plates secured to the under side of the plow beam and projecting laterally therebeyond, a ring engaging against the under sides of said arcuate plates, inturned fingers extending downwardly from the outer edges of said plates and engaging beneath said ring, and a locking bolt for engagement downwardly through one of said arcuate plates and through said flat ring to hold the latter from turning beneath the plates, said fingers being located at the opposite extremities of said arcuate plates to hold said flat ring from swinging away from the plates and from lateral displacement from beneath the plow beam.

7. In a reversible plow, a plow beam, front and rear guides secured to the beam, a turntable mounted in the guides, a diametrically extending brace for the turntable engaging said beam between the guides, standards carried at the ends of the brace, a longitudinally extending double land-side connected at its opposite ends to said standards, a mold-board also connected to each of said standards and extending inwardly and laterally from the land-side, the inner ends of said mold-boards abutting, an angle iron secured across the meeting ends of the mold-boards to hold the same together and having an upstanding post secured to the turntable, a pivot bolt secured at its lower end to the land-side and extending upwardly and centrally through the turntable, the brace, and the plow beam, and means for locking the beam and the turntable together to secure the same when relatively adjusted.

In testimony, that I claim the foregoing as my own, I have hereto affixed my signature in the presence of witnesses.

FRANCISCO DRALVERADO WALLACE.

Witnesses:
EDNA F. VOLKER,
H. C. WILLIAMSON,
R. S. WELD.